US005140480A

United States Patent [19]
DeMoss

[11] Patent Number: 5,140,480
[45] Date of Patent: * Aug. 18, 1992

[54] METHOD FOR TRANSDUCING WITH A FLYING HEAD WITH FOIL SUPPORT

[75] Inventor: Dean DeMoss, Camarillo, Calif.

[73] Assignee: Unisys Corporation, Detroit, Mich.

[ * ] Notice: The portion of the term of this patent subsequent to May 18, 1999 has been disclaimed.

[21] Appl. No.: 412,092

[22] Filed: Aug. 27, 1982

Related U.S. Application Data

[60] Division of Ser. No. 251,227, Apr. 6, 1981, Pat. No. 4,396,965, which is a continuation-in-part of Ser. No. 48,701, Jun. 15, 1979, abandoned, which is a continuation of Ser. No. 909,793, May 26, 1978, Pat. No. 4,163,267.

[51] Int. Cl.$^5$ .............................................. G11B 5/60
[52] U.S. Cl. ..................................................... 360/102
[58] Field of Search .................. 360/102, 103, 84, 99, 360/122, 129, 130; 308/DIG. 8, DIG. 9

[56] References Cited

U.S. PATENT DOCUMENTS

| | | |
|---|---|---|
| 3,678,482 | 7/1972 | Billawala .............................. 360/103 |
| 3,900,893 | 8/1975 | Hirose ................................. 360/102 |
| 3,961,372 | 6/1976 | Brock et al. ......................... 360/102 |
| 4,003,091 | 1/1977 | Wright ................................. 360/102 |
| 4,072,330 | 2/1978 | Norton et al. ....................... 360/102 |
| 4,163,267 | 7/1979 | DeMoss .............................. 360/102 |
| 4,330,844 | 5/1982 | DeMoss .............................. 360/102 |
| 4,396,965 | 8/1983 | DeMoss .............................. 360/102 |

Primary Examiner—David J. Severin
Attorney, Agent, or Firm—John J. McCormack; Mark T. Starr

[57] ABSTRACT

Disclosed is a novel flying head supported on a stationary, rigid arm to present a "hydrodynamic" head-face to a passing flexible record segment, the segment being induced by this face to automatically assume a prescribed, relatively controlled configuration and spacing relative to the head-face.

23 Claims, 10 Drawing Sheets

PRIOR ART (FIN. FLOAT)

Fig. A

PRIOR ART (LANDING)

Fig. B

METHOD FOR TRANSDUCING WITH A FLYING HEAD WITH FOIL SUPPORT

CROSS REFERENCE TO RELATED APPLICATIONS

This is a division of U.S. patent application Ser. No. 251,227, filed Apr. 6, 1981 now U.S. Pat. No. 4,396,965 which is a continuation of Ser. No. 048,701, filed Jun. 15, 1979, abandoned, which is a continuation of Ser. No. 909,793, May 26, 1978, now Pat. No. 4,163,267, all cases by Dean DeMoss and all commonly assigned.

Other related applications are U.S. Ser. No. 218,320 filed Dec. 19, 1980, and now abandoned; and U.S. Ser. No. 063,755 filed Aug. 6,1979, and now issued as U.S. Pat. No. 4,330,804—both of these being commonly assigned with the previously cited applications.

INTRODUCTION

This invention relates to structures for "non-contact" magnetic recording and more particularly relates to improved "flying-head" transducers and associated techniques for such recording.

BACKGROUND, FEATURES OF INVENTION

Workers will recognize that various techniques are known for confronting magnetic recording media with a magnetic recording transducer face. For instance, according to one technique, the transducer face is brought into contact with the passing medium. According to another technique ("non-contact" recording) the transducer face is virtually "flown" above the medium and kept out of contact therewith as a guard against damage to the medium, to the face or both. Generally speaking, workers prefer such "out-of-contact" techniques where feasible. This invention concerns an improvement in "non-contact recording" and an associated novel configuring of the transducer face.

Magnetic memory storage units are a significant item of peripheral equipment in today's computers. In the typical unit data is stored on one or several magnetic disk drives. Such a drive will be recognized as characterized by one or more rotating magnetic recording surfaces on which data may be written, and read back, by a magnetic transducer mounted in a recording head. Such heads are "flown" in close proximity above a recording surface. Great care is taken that this flying head never "crashes" against the disk since catastrophic damage to both can result. Yet, to maximize recording density and optimize signal/noise, workers know that the "head spacing" (spacing between the head-face, and core there, and the surface of the moving disk) must be kept as small as possible and be held within very tight tolerances.

It is common to establish "head spacing" for a "flying head" by configuring the head-face in the fashion of an "air bearing" while establishing the proper fluid dynamics. The magnetic head surface is, today, mounted on a resilient suspension and urged toward the surface of the moving disk by a head actuation means, but is prevented from actual disk contact by an intervening cushion of air—called a "Bournoulli film" and established as the air bearing. Once this Bournoulli film is developed, it presents a rather substantial hydrodynamic resistance to reduction of "head-spacing" and significant force must be exerted to push the head closer to the disk. But certain abnormal conditions can disturb this "Bournoulli film" and suddenly remove it as a protective cushion, sending the head crashing into the disk. Thus, workers in the art are very meticulous in developing the proper (aerodynamic) head-face configuration and in positioning the head so as to properly orient it (e.g., re pitch and roll angles) relative to the passing disk such close tolerances that a change of a minute of arc or so can be critical!

Worker know that it is critically important to maintain a predictable constant "head spacing" over a wide range of operating parameters if magnetic recording is to be successful. Head spacing is particularly critical with high density recording—e.g., it can vary the "fringing flux" pattern and affect read/write resolution.

The foregoing relates, mainly, to rigid media technology and—as workers are beginning to realize—is not necessarily applicable to flexible disks. This invention is particularly concerned with improved transducer configurations especially adapted for "near-approach" to floppy disk media during read/write sequences.

Workers also know that there are many factors affecting head spacing; such factors as the speed, configuration "penetration" and radial-position of a head [understand: "head speed" as the relative velocity between medium and transducer and "head penetration" as the penetration of the transducer stabilizer combination into the plane of the passing record medium, causing the latter to "dimple"]. Other affecting factors are disk characteristics (e.g., flexibility, thickness, etc.) and ambient conditions such as temperature and humidity.

EARLY EFFORTS

Until recently, workers have been very uncertain as to how to present (mount) a (R/W) transducer means in operative relation with a passing flexible medium, like a floppy disk. Little guidance was afforded by experience with conventional (digital magnetic recording) tape because this medium moved comparatively slowly and in contact with its transducer head, with bit-density being relatively less critical. "Flying" a head relative to tape was not practically contemplated, or even thought necessary.

And the rigid disk technology was not too helpful. For instance, "Winchester" type heads typically used to over-fly spinning rigid disk media were tried with floppy disks—and results were disastrous, with head crash quite common!

Attempts were also made to configure known head arms, or "paddles", (which commonly carry a "R/W head" into operative relation with rigid disks—e.g., see arm A, FIG. 2A) to "fly" relative to floppy disks but with no real success [e.g., distal end of paddle shaped like "air-foil" or made cone-shaped—with, or without a "head" mounted thereon]. Also tried was a rigid "paddle" carrying a conventional R/W head button which was, in turn, mounted on a certain "pedestal"—e.g., a cylindrical-nosed pedestal or a "concave-sided mesa" type pedestal. Neither approach promised success. But—when such a rigid "pedestal" was re-configured to present a prescribed kind of spherical face to the approaching disk surface—according to a feature hereof—success hove into sight! An object hereof is to teach such a novel head-support combination.

Now, it is preferred here that a transducer be thrust to "penetrate" and "dimple" the flexible medium, and so better assure that head spacing be kept constant. However, such a "dimpling" can cause problems. For instance, it may degrade the desired film (Bournoulli) at the disk periphery and cause "flutter" there to upset the prescribed head spacing. Such problems have, to date, limited the useful recording area adjacent a disk's periphery, as workers well know. The present invention is adapted to help in maintaining constant head spacing by eliminating, or at least alleviating, the mentioned problems and so improving disk-head stability—particularly for "flying heads" adapted to transduce for a pack of floppy disks (rather than more than one disk). In such cases, there will be no "backing plate" (Bournoulli plate) as is typically used with a "single floppy" [e.g., IBM U.S. Pat. No. 4,074,330 mentions that a problem with such Bournoulli plates is that head spacing decreases as the head moves radially out on the floppy disk—and tries to solve this problem].

Now, the trend today is to record at ever higher "bit densities" (that is, to record individual data transitions that are closer together). And, as bit densities increase, one must reduce the "head spacing" more and more, as workers well know, (also, signal strength increases as head spacing drops). Thus, the task of configurating a head face to create the proper Bournoulli film becomes ever more critical with today's advanced high-bit-density equipment where head spacing on the order of just a few microinches is not uncommon.

This problem is greatly aggravated when one uses flexible disk media (floppy disks). As workers well know, it is not uncommon for such disks to develop surface undulations approximating several dozen microinches under high speed rotation.

Progress toward the more effective use of high speed flexible disks in recording systems is facilitated by a better understanding of stabilization requirements. Some workers, [see articles by R. Benson, D. Bogy in J. Appl. Mech., Vol. 45, p. 636 (1978); and by H. Greenberg, IEEE Trans., Vol. Mag-14, 5 (1978)] have studied the overall response to a localized load on a flexible disk. Greenberg (above) describes the head/disk interface with an expression that uses Reynolds equation for loading. This invention is directed toward establishing improved head surface geometry as a means of optimizing flying characteristics; and especially for providing stable, relatively uniform air bearing spacings in the sub-micron region at higher surface speeds (e.g., 40 m/sec.). It is an object of the present invention to develop a novel head configuration adapted to provide a proper "Bournoulli film" cushion when employed with flexible disks under high speed rotation, especially for transducing at high bit densities.

The use of flexible magnetic recording disks as a storage medium in an environment requiring high linear speeds has necessitated the design of air bearing contours which can provide reasonable wear characteristics at stable, sub-micron spacings. Unlike rigid disk sliders, these bearings must cope with the flexible nature of the disk as well as with the gas pressure forces which support it.

Several means for supporting a flexible disk in close proximity to a recording transducer have been discussed by workers in the art. I. Pelech and A. Shapiro [see J. Appl. Mech., Vol. 31, p. 577, 1964]; and P. Charbonnier [see IEEE Trans., Vol. MAG-12, 6, 1976] have discussed the possibility of a head fixed in a stationary plate, near which a flexible disk is rotating. The air film which develops between the plate and the disk serves to stabilize the disk in the axial direction. Charbonnier also suggested the use of a forced air nozzle to locally support the disk in the vicinity of a recording head.

The transducer may also be supported by an air bearing on the side of the disk opposite the stationary stabilizing plate. This approach facilitates radial motion of the head in order to access written tracks on the disk surface. The instabilities associated with the application of a stationary, localized load to a flexible disk supported in this manner have been analyzed by Benson and Bogy (article cited above), who provide a description of the disk response. Although this latter solution addresses the head/disk interface as well as the disk motion, the spacings developed are not adequate for high density digital recording.

This invention addresses the design of a suitable air bearing for use with a rotating flexible disk. The disk in this configuration is one of many co-rotating flexible mylar disks which are separated by thin spacers through which air is permitted to pump naturally, outward in the radial direction. The air bearing spacing is thus controlled by the pressure forces resulting from the self-acting gas film, opposed by the forces exerted by the disk and by the air flowing behind it. This bearing must maintain a uniform, stable, predictable spacing between the magnetic transducer and the media, while minimizing wear between the two adjacent surfaces. The dynamic stability of the disk must also be preserved.

FIXED HEAD VERSUS MOVABLE HEAD

It is conventional to design a computer disk file so that its flying recording heads are "movable" rather than "fixed". When operation begins and the disk surface is spun-up to the proper operating speed, the recording head is advanced, being pressed toward the disk to a "final float" position—close enough to generate the desired air bearing (Bournoulli film). Such a "flying head" may later be retracted when the disk is stationary (or rotated at low rpm) as desired (e.g., when "read/write" is completed). The technique used in bringing the head from "retracted" to "final float" position is commonly referred to as "landing" the head (even though there is no physical contact with the disk). This invention relates to "fixed" heads, and to techniques for promoting a more stabilized "final float" condition.

An example of a movable recording head is seen in U.S. Pat. No. 3,310,792 to Groom, et.al. Here, a resilient gimbal spring is provided to suspend a magnetic recording head adapted to float on an air-film adjacent the surface of a rapidly moving memory disk. This gimbal spring can withdraw the head from the "float" position (e.g., see FIG. A) to "retracted" position (e.g., compare FIG. B) whereat the spring is in its neutral, or unstressed, condition. Advancing the head (e.g., via a driving pneumatic piston) back to "float" position, stresses the spring. Besides mounting the recording head for advancement and retraction, the gimbal spring also accommodates proper head orientation—exerting a very small moment on the head so that in "retracted" position, its "toe" (or leading edge) is further from the disk than its "heel" (or trailing edge)—whereas when in the "final float" position, the Bournoulli film developed will rotate the head somewhat so that its "heel and toe" are more nearly equidistant from the disk (compare FIGS. A and B).

Now, during "landing" there is danger of the heel contacting the disk, with the toe being pitched-up unless a significant Bournoulli film has been generated. In the past this problem has been addressed via a compromise between minimizing head spacing and optimizing read/write efficiency vs. emphasizing a "safe" landing mode (i.e., with too close a spacing, there is a high risk of "crash", whereas too great a spacing will degrade recording characteristics). This problem is addressed and, to an extent, solved by techniques taught in U.S. Pat. No. 3,678,482 to Billawala, discussed below.

PRIOR ART HEAD MANIPULATION; FIGS A, B:

FIG. A illustrates a typical prior art recording head 16 understood as "flying" adjacent a recording disk 17 in its "final float" position. (See also U.S. Pat. No. 3,678,482 for further details). As illustrated here, disk 17 will be understood as moving from right to left, with construction and operation being carried out conventionally except as otherwise specified. In its "final float" position, the recording head 16 floats with its heel end 19 at a minimum distance H from the surface of disk 17 and its face 21 tipped-away very slightly (or "pitched-up" by a very small angle $\theta$) so the forward projection of face 21 (i.e., bevel face 22 adjacent toe-end 18) is tipped slightly further away from disk 17, as known in the art. Face 21 is relatively flat and, being pitched-up slightly toward the approaching recording surface; merges into the second flat face 22 beveled away from the record and diverging from face 21 by a prescribed relatively small angle $\alpha$(—the trailing edge of face 22 thus coinciding with the leading edge of face 21, as illustrated).

It should be recognized, of course, that angles $\alpha$ and $\theta$ and distance h (as well as other like angles and distances set forth elsewhere herein) are greatly exaggerated for illustration purposes as compared with actual scale. Thus, for instance, in the prior art fluid film bearing illustrated in FIG. A distance h will preferably be on the order of a few dozen microinches and angles $\alpha$ and $\theta$ on the order of a few minutes of arc.

As workers know it is conventional for a gimbal spring arrangement (not shown, but well known in the art) to be provided for suspending head 16 and permitting the indicated orientation—the head being thrust toward and away from record 17 by a piston arrangement 23 (not fully illustrated, but constructed and operated as well known in the art).

Under certain conditions head 16 is retracted (e.g., when disk rpm drops); conversely, the head may be advanced to "land" adjacent the disk for read/write operations when disk rpm reaches "operating speed". When piston 23 acts to so thrust head 16 it will be understood that a force P is applied and a moment M set-up to overcome the (rather slight) gimbal-spring-moment and rotate the head to fly more parallel with the passing disk surface (e.g., rotate head 16 from FIG. B to FIG. A orientation). A counter-moment M is then generated by the fluid film against both head faces; this made-up from a force F-1 acting through the center of pressure on the main face 21 and a force F-2 acting through the center of pressure on the bevel face 22. Thus, in "landing", it will be understood that pneumatic pressure applied via piston 23 forces the head toward disk 17 (—starting from the "retracted" position illustrated in FIG. B) to reduce angle $\theta$ and eventually wind up in the "final float" position indicated in FIG. A. During "landing", it will be understood that the gimbal spring will tilt toe end 18 upward so that as head 16 is pressed toward disk 17, the heel 19 first approaches the disk—at this point a force F-1, originating from the fluid film, will commence to act on main face 21, pivoting heel 19 slightly away from record 17. (There being little or no fluid film pressure then applied upon bevel face 22 since it is still too remote from disk 17).

In the final phase of landing, it will be understood that the force distribution on head 16 is such that piston 23 must be located near the heel 19 (higher density air film then present). That is as the head approaches "final float" position and head spacing decreases, the point of application for piston 23 against head 16 moves closer to heel 19 (this maintaining the desired angle $\theta$ for stable floating). With piston 23 positioned nearer heel 19, the landing moment is reduced (smaller moment arm, so F-1 is lower) and care must now be taken to avoid a "crash" against record 17 (heel 19 could strike disk 17 before sufficient balancing force F-1 is generated to pivot recording head into its final floating position.

The foregoing description relative to FIGS. A and B will serve to illustrate typical characteristics and problems associated with prior art, "non-rigid" heads and call associated difficulties to mind. Heads arranged according to this invention avoid all such difficulties since they are mounted to be rigid (non-movable) and arranged to induce the (flexible) medium to, alone, make the necessary approach and "landing". This should help workers to better appreciate the advantages and characteristics of a rigid-mounted "compound foil" head according to the invention—wherein no head positioning or alignment is required, but rather a simple presentation of the moving flexible disk so it will automatically position itself in proper transducing relation with the head core (as further discussed below). The operational advantages and the manifold difficulties avoided will be self-evident to workers familiar with this art.

PRIOR ART: DIFFICULTIES IN "FOLLOWING" FLOPPY DISK WITH MOVABLE HEAD FIG. 1A

FIG. 1A shows, very schematically, some of the factors involved in confronting a flexible magnetic recording medium, such as a floppy disk surface M, with a "canoe" type head A-1. Here, disk M will be understood as swept rotationally past the recording face of transducer head A-1 which is understood as mounted on a prescribed flexible suspension (indicated very generally as spring means A-2 and well known in the art). Head A-1 is shown as taking the form of the well known "canoe head" tilted up a prescribed pitch angle (aa) from coplanarity with an idealized perfectly level contact-plane R—R along which medium M (the confronting surface thereof) would ideally be swept. Medium M is given an exaggerated "wavy" configuration, since, as workers well know, it is very, very difficult to maintain such a flexible record surface flat along the prescribed plane R—R.

It will be recognized that in such an arrangement the head A-1 is "flown over the disk", its transducing face being urged compliantly towards reference plane R—R for transducing on the disk. Also, means will be understood as provided to urge the surface of head A-1 close to medium M, separated only by the Bournoulli air film of minute thickness, and to be very precisely maintained for accurate repeatable recording. As workers well know, so locating the head and moving floppy medium so close together and maintaining this precisely is akin to squeezing two spring-mounted foils together, as they pass one another at high speed—all in all a very unpleasant, somewhat imprecise, balancing act that can frequently go awry, with the result that read/write defects are introduced. This invention avoids such difficulties by postulating a relatively rigid transducer head over which the medium is made to fly—rather than flying the head over the medium.

One of the problems in prior art arrangements, like that of FIG. 1A, where the head is flown over the medium, is in making the "air bearing" (intervening film) stiff enough to maintain head-disk spacing despite changing factors. A related problem is to always maintain the pitch angle of the head constant relative to the approaching disk surface—and so mounting and driving the head mass that it closely "follows" the passing, undulating surface of a floppy disk. This, of course, is a very serious challenge since, when rotated at the usual high speeds, floppy disks can undulate and flop wildly. The frequency of these undulations is often so high that the head-following mechanism cannot really "follow" and maintain the tiny head-disk separation (as little as a few u-in.).

Another problem in so "following" floppy disks is that the head mass must really be made "ultra-light"—even so, it is difficult to find a spring system matched to the disk and to actuate it with the proper "following mechanism". Also, in any situation where a flexibly mounted head is arranged to follow a floppy disk surface, extreme difficulties can result from "feedback oscillations" often encountered. That is, an undulating disk can, for instance, cause sympathetic oscillations of the head. And the head, which typically has a different resonant frequency than the disk, will maintain these unwanted oscillations for some time before settling down—and may impact disks damagingly. On the other hand, using a rigid head, as in this invention, will lower the "Q" of the flexible medium and can damp-out such unwanted vibration.

The foregoing problems are exacerbated when operating a floppy disk in the desired "steep dive" mode whereby disk and head normally fly at a relatively large interspacing, with this being suddenly reduced as the head approaches the recording zone on the disk—then, the head dives steeply toward the disk (or vice versa) and is removed therefrom just as suddenly when the recording zone is passed (the head climbing steeply away from the disk). Such "steep dive" mode presents serious risks of damage to head, or to the disk or both, since a "crash" is much more likely under these conditions, with the stiffness of the air-bearing (Bournoulli film) varying widely the while. The present invention simplifies this situation greatly by making it unnecessary to "dive the head" toward the disk—rather it aerodynamically "sucks" and holds the disk (recording zone) closer to the rigidly-mounted head face (quasi "dashpot" effect).

INVENTION FEATURES

This invention avoids the problems suggested above by mounting the head rigidly and inducing the passing disk segment to fly over the head in a prescribed manner. So doing, there is no need for spring-mounting the head, nor for related sensing and actuator mechanism to move the relatively large transducer mass. Rather, one simply develops aerodynamic forces that constrain the (relatively low mass) disk to "fly" at the proper height above the transducer core, with no need to "follow" the disk surface, as well as advantageously using a relatively "self-leveling" structure (the rotating floppy disk) to reference on a fixed stable surface (the rigidly-mounted transducer face).

Thus, as one feature of novelty, the present invention involves flying a flexible disk over a rigid head with the head face configured aerodynamically to induce a rather "steep mode" of confrontation, preferably, and involving a "compound curvature" configuration. (cf a small "lens" atop a large "lens"). In a related feature, a prescribed spherical head-foil is mounted atop a relatively flatter spherical mount-foil such that the stabilization-zone of the head-foil is kept within the (larger) stabilization-zone of the mount-foil, and more stabilized transducing promoted.

BRIEF DESCRIPTION OF THE DRAWINGS

These and other features and advantages of the present invention will be appreciated by workers as they become better understood by reference to the following detailed description of the present preferred embodiments. These should be considered in conjunction with the accompanying drawings, wherein like reference symbols denote like elements;

FIGS. A and B are schematic elevations of a prior art transducer head in "final float" and "landing" position, respectively, relative to a passing record medium;

FIGS. 2A and 2B illustrate a preferred "compound-foil" recording head embodiment in plan view and side-view respectively; while

DESCRIPTION OF PREFERRED EMBODIMENTS

Figure 1A:
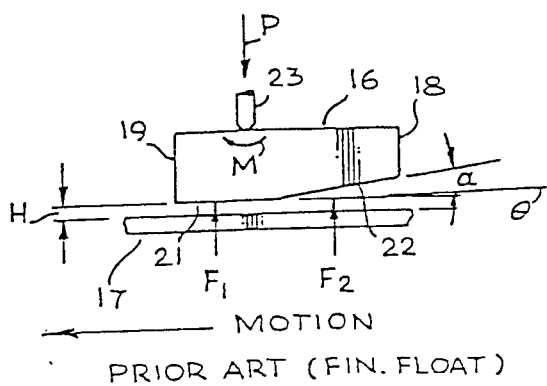
FIG. 1A is a very schematic elevation of a prior art transducer flexible disk arrangement.
Figure 1A:
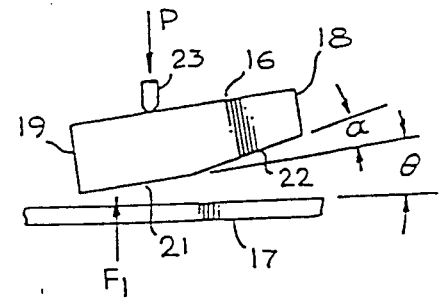
Figure 1A:
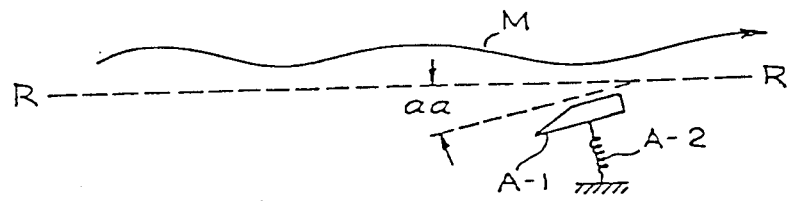
Figure 1B:
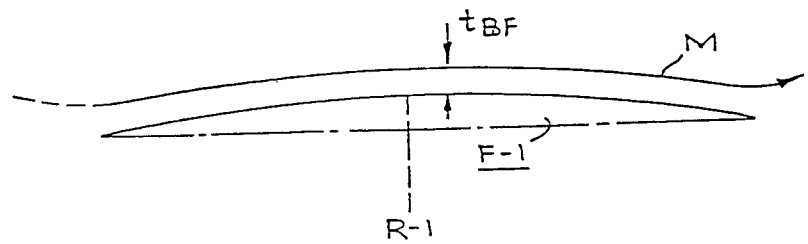
FIG. 1B is a schematic elevation showing a flexible disk passing over a "single foil" configuration; with FIG. 1C showing the same in plane view.
Figure 1C:
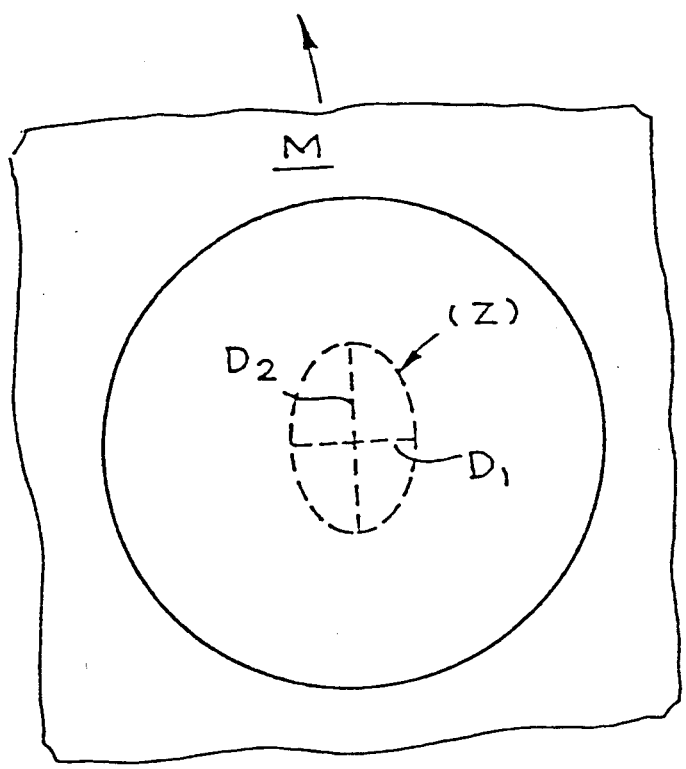

General Principles With "Single-Foil" Head, FIGS. 1B, 1C,

Workers in the art are familiar with the principles whereby, in "flying" a flexible medium over a relatively spherical "foil" surface, a "Bournoulli air film" is developed—the thickness of the film being dependent upon the relative velocity between the foil and the disk, the stiffness of the medium, and the spherical radius of the foil ($t_{BF}$, v, $K_m$, $R_f$). Such an arrangement is very schematically indicated in FIG. 1B wherein a relatively spherical foil F-1 having a radius of about 6 inches (R-1) will be understood as overflown by a flexible disk medium M at several hundred ips or more surface velocity, assume about 3000 rpm for 15 in. disk—such that a Bournoulli air film of thickness $t_{BF}$ is developed (assume a 1.5 mil thick disk with a Bournoulli film thickness $t_{BF}$ of about ½ mil—this varying slightly with the disk radius).

Now it is found, quite interestingly, that such an arrangement can generate a stabilized "approach zone" Z, where disk foil separation is a minimum and is relatively constant (under proper conditions)—the size and shape of the zone varying with foil radius and "foil penetration" (i.e., the dimpling or deflection of the flexible medium by the head).

Such a zone Z is indicated in FIG. 1C wherein the foil F-1 of FIG. 1B will be understood as mounted to confront medium M (being swept past as in FIG. 1B). Such a zone Z will typically take an elliptical shape for most portions of a passing floppy disk (as illustrated in FIG. 1C and further explained below), this shape being characterized by diameters $D_1$, $D_2$, as illustrated. It has been found that the average diameter $D_a$ ($D_a = D_1 + D_2/2$) or the average zone area, roughly speaking, will vary with foil penetration. But this dependence varies, in turn, with foil radius. Zone area will be observed to change relatively little with increasing foil penetration for a relatively "steep" foil transition (i.e., small radius foil, e.g., 1 to 2 inches, with penetration from 10 to 20 mils)—whereas it changes much more with increasing foil radius (that is, as the foil gets flatter, stabilized zone Z increases in size considerably as penetration increases—this attributed to disk stiffness, impeding "sharp turns" by disk).

The elliptical form of zone Z is believed due to an asymmetry in tension forces acting on the medium adjacent—that is, in many instances, the tension across the plane of the disk will be high in the radial direction (stretched), but relatively low in the direction of travel (less peripheral stretching, except at the edge of the disk)—this serving to resist the spread of stabilized zone Z in the radial direction $D_1$ but resisting it relatively little in the peripheral direction $D_2$ as postulated in FIG. 1C. Such a stabilized zone Z for the above-mentioned foil of FIG. 1B will be found in certain conditions to exhibit diameters of about 0.8 inches being relatively elliptical as indicated in FIG. 1C.

Now, it has been found—quite surprisingly—that such foils can be made and operated so that such a zone Z maintains a relatively constant foil-medium separation $t_{BF}$ despite minor undulations of the medium and despite penetration changes—i.e., the medium "follows" the foil (zone area) even as the foil is moved further toward it. For instance, a relatively "flat" foil, with a radius of about 12 inches, has been found to hold a minimum foil-disk spacing of about 0.75 mils, despite a shift in "foil penetration" from about 10 mils to about 20 mils—this varies with foil radius, however. And, with a relatively "steep" foil, having a radius of about 1.6 inches, the foil-disk spacing has been kept constant at about 0.25 mils over the same 10 to 20 mils variation in foil penetration.

Accordingly—according to a feature hereof—it is proposed that a head-foil be mounted atop such a "mounting foil", in this "approach zone" Z thereof, of constant flying height (as below). One may cause the disk to fly over the head in that zone, being operated so as to maintain the Bournoulli thickness despite minor variations in "foil penetration" (e.g., caused by manufacturing or assembly variances). Such a "two foil" array is discussed below and rather generally indicated in FIG. 5.

Figure 5:
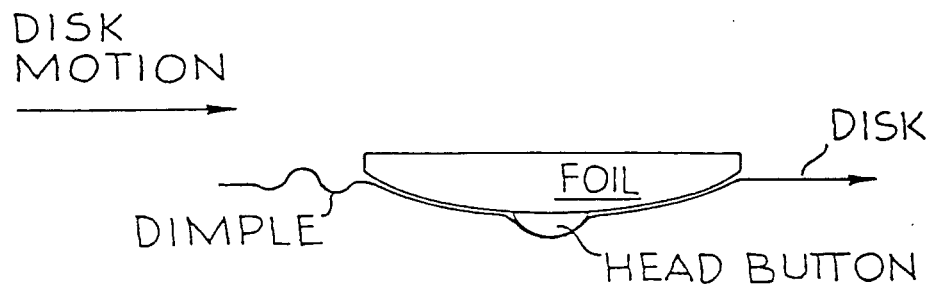
FIG. 5 is a simplified side view of the general foil supported button embodiment.
Figure 6:
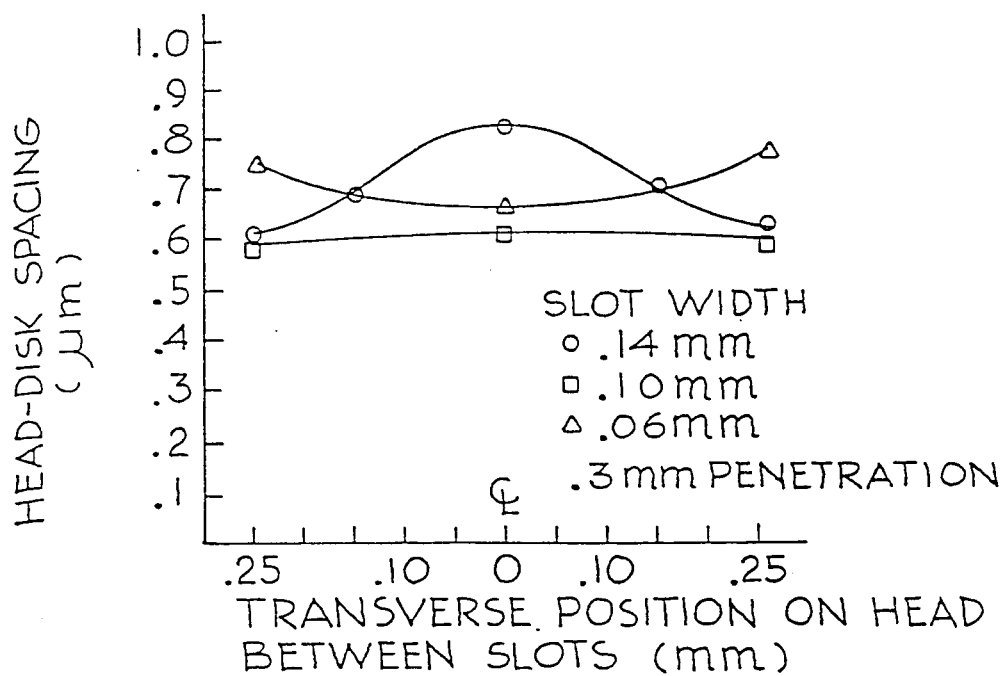
FIG. 6 is a plot of head-disk spacing as a function of inter-slot position and slot width.

As was treated in the aforementioned studies by Bogy and Benson and by Greenberg, wavelike instabilities occur on the disk surface as a result of the application of a stationary, localized load. If allowed to occur near the magnetic transducer, these disturbances will cause undesirable modulation of the signal. In order to smooth and stabilize a region of the disk adjacent the transducer, a spherically shaped "foil" is provided according to the invention and is loaded against the disk surface, as shown in FIG. 5. This foil, which is larger in both diameter and spherical radius than the button supporting the transducer, forms a self-acting air bearing, separated from the disk by approximately a suitable distance (e.g., 12.5 um preferred here).

Experience has shown that sharp corners, or even small radiused regions, are undesirable in the vicinity of an oxide-coated mylar disk, largely because of the accelerated wear which can result. The use of a spherical "slider", or head button, similar to the foil only of smaller diameter and spherical radius, presents a smooth surface to the disk. Material is thus recessed from the disk surface in each area except in the center, where the read/write transducer will be located. Optimization of both foil and button geometries, and control of the disk/transducer spacing, may be accomplished using stroboscopic white-light interferometry (with glass lens foil and head). An ideal air bearing design will provide a stable interface dimension between head and disk, and white light interference affects will yeild color values corresponding to the various film thicknesses that are observed.

Figure 9:
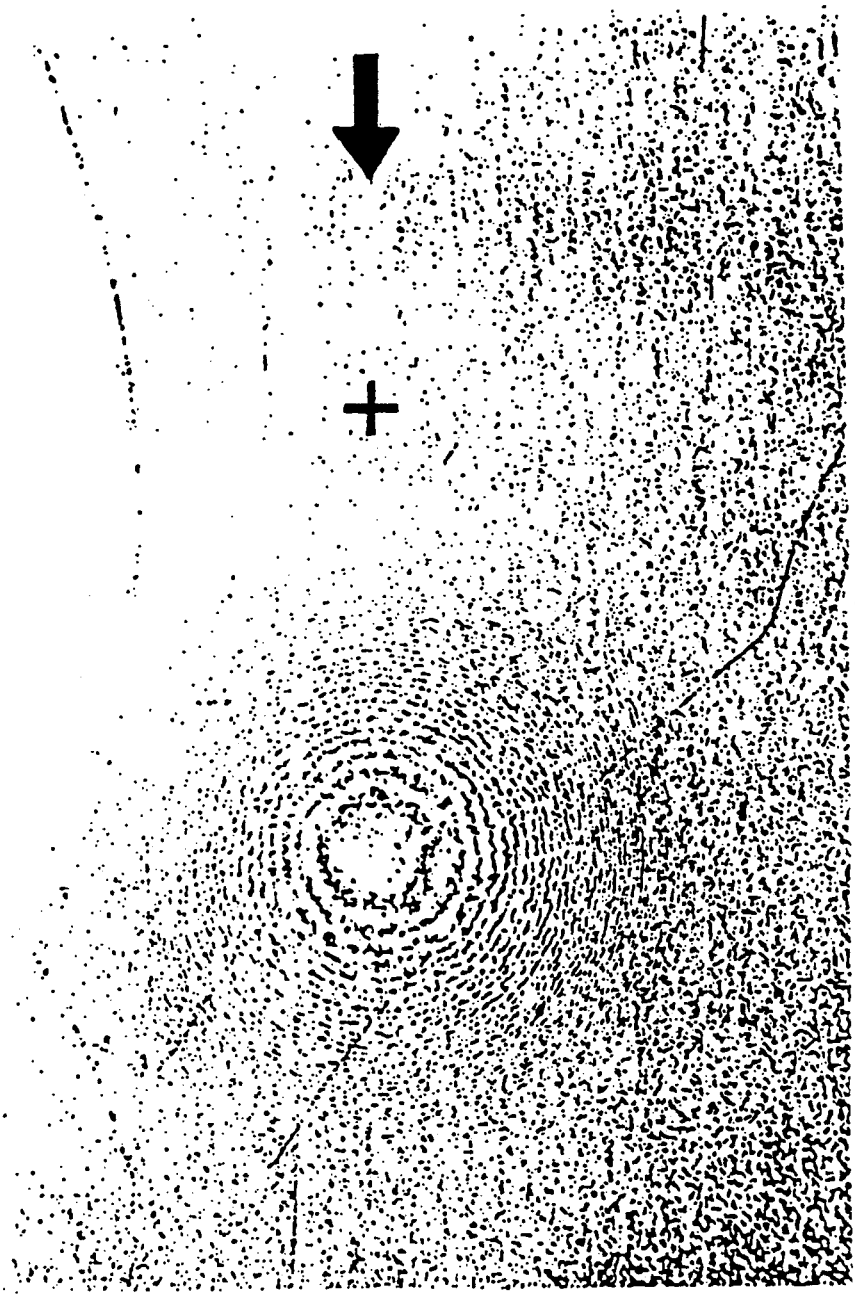

FIG. 9 shows the interference-contour pattern obtained for a spherical air bearing geometry at the typical surface speed and load. This is a typical fringe pattern for a spherical head button (here, radius of curvature = 3.8 cm.; assume monochromatic light at 0.59 um wavelength used for photographic clarity). FIG. 9 is a reproduction from a static photo and simulates the pattern obtained with disk moving in direction of the arrow.

The curvature of the head surface provides relief from the disk in all directions, while achieving the desired closer spacing in the center region. It is interesting to note how the center of the "flying bubble" dimpling the passing floppy disk, is displaced rearward from the geometric center of the head surface; evidently due to the diverging flow, and resultant negative pressure in this region. Although sub-micron head-disk spacings suitable for magnetic recording can be obtained in this manner, there are difficulties which make this configuration less than optimum. The amount of penetration into the disk that is required to achieve usable spacings is quite large, and may result in undue wear between disks, or in other dynamic disturbances. In addition, the location of the region of closest spacing is relatively sensitive to head attitude with respect to the disk surface, and falls off quite rapidly in all directions from this location.

Figure 7:
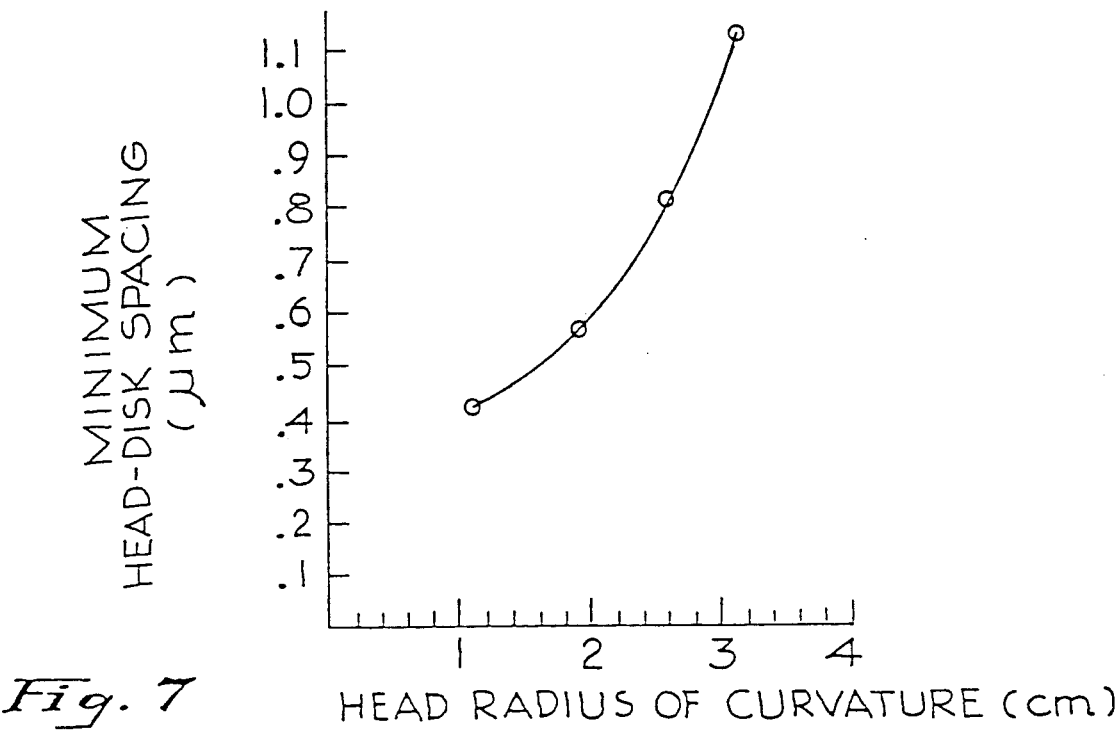
FIG. 7 is a plot of minimum head-disk spacing as a function of head radius.

To a certain degree, the head-disk interface geometry can be controlled by changing the radius of curvature of the head. As indicated in FIG. 7, reducing head radius, and thus relieving the head contour from the disk surface, results in a smaller head-disk spacing at the minimum point. The foil, with a 15 cm curvature, would support a spacing of approximately 12.5 um, thus providing an upper limit for the curve. Although curvatures of approximately 1.9 cm and less provide suitable minimum head-disk spacings, the aforementioned difficulties indicate a need for some further means of controlling the interface geometry.

"TWO-FOIL" HEAD EMBODIMENT; FIGS. 3A, 3B

As a feature of this invention it is postulated that a transducer head be mounted, somewhat conventionally in a first foil structure, then this foil be mounted, in turn, atop a second, flatter, (mounting-)foil of the type discussed above (well within the approach zone Z thereof)—this resulting in a "compound foil", or "compound lens", head configuration. It is found that with such a "compound foil" head, the disk will establish its own flying height and will execute a "two-step" head-approach—i.e., will decend toward the mounting-foil as above (to establish approach zone Z); then, within zone Z, will dive steeply toward the head's "recording zone ZZ and return steeply therefrom, as is generally indicated in FIGS. 3A and 3B.

Figure 3A:
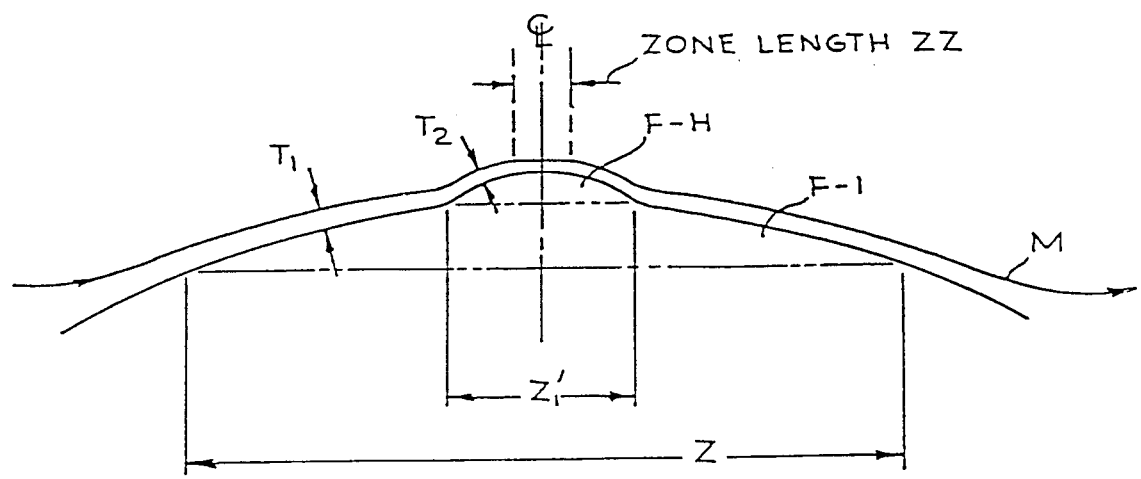
FIGS. 3A, 3B, 3C are enlarged orthogonal side elevations of the same as confronted by a passing flexible medium segment, seen from two perspectives at right angles to one another.
Figure 3B:
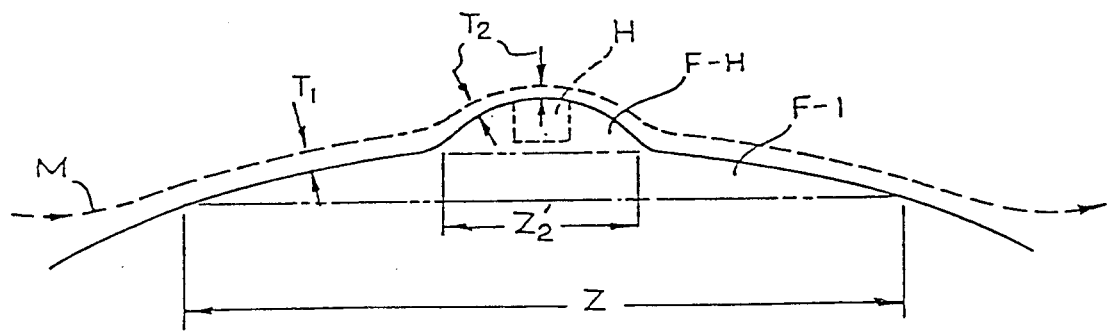

Here, it will be seen that the transducer foil F-H comprises a relatively spherical head-foil section mounted atop a "mounting-foil" F-1, as above mentioned, so as to induce a passing floppy disk segment M to assume an approach zone Z of stabilization as in FIG. 3A together with a secondary, "transduce zone" ZZ (above F-H). Head foil F-H is disposed within the ambit of this stabilized zone Z with its outer radius blending with the peak surface of F-1. An "edge-foil" annulus F-2 surrounds F-1 to minimize disturbance to a passing Bournoulli air film. The edge foil (or blending foil) F-2 is believed necessary to eliminate sharp transitions and flow discontinuities, thus minimizing any resultant disturbance of the desired laminar Bournoulli flow and avoiding consequent air turbulance and drag.

As a subsidiary feature it is also preferred that head foil F-H be projected well beyond the passing Bournoulli film. That is, the apex of head foil F-H will protrude well into the plane of medium passage, past the Bournoulli film $t_{BF}$ (about $\frac{1}{2}$ mil in the subject example). In such a case it is found—quite suprisingly—that the passing disk will gently rise and overfly this "secondary lens" protrusion (F-H) quite readily. Now—again, surprisingly—the flying height of the disk as it thus passes over head F-H is somewhat greater than that established by the head foil F-H, by itself (in the absence of foil F-1). Also, surprising: while increased "foil-penetration" increases the area of the major stabilized zone Z, it doesn't significantly change head-spacing (flying-height) over head foil F-H, (FIG. 3B shows this).

For example, assuming a head-foil radius of 1.6 in., it will be seen that the head-foil alone would induce a Bournoulli film thickness of about 0.2 mils; whereas, as above noted, the mounting foil F-1 by itself induces a Bournoulli film thickness of about 0.5 mils. Now, when combining these two foils in a "compound" (two-foil) configuration (that is, mounting the steeper foil F-H upon head foil F-1), the Bournoulli film passing over F-H was only about 0.25 mils thick (in head zone Z'; see FIG. 3B, spacing $t_2 = 0.25$ mils; $t_1 = 0.50$ mils).

In other words, as the air film established by the foil passes the head it will be observed to be partly deflected around the center of the head node, inducing the disk to fly at a lower height, there, than that height established by the mounting foil alone. This air film, established in zone Z' adjacent the apex of head foil F-H, might be characterized as a "second order Bournoulli film"—i.e., a thinner air bearing, resulting when a given foil is surmounted with a "steeper" foil.

HEAD SLOTTING; FIGS. 8, 3C

Also, with this "compound curvature" reducing Bournoulli film thickness above head-foil F-H it would still be desirable to reduce head spacing (e.g., to a few u-in.) above the small recording zone adjacent the cores (on F-H). That is, it is very desirable that after the disk has entered zone Z' it be induced to "dive steeply" toward the core region atop F-H; and then return quickly after passing the cores—reducing head spacing to a few u-in. thus, establishing a transducing zone CR (FIG. 4; modifying FIG. 3B by radically reducing height $T_2$ to a few u-in.; i.e., to height $T_3$; ZZ is width of zone CR, and can typically be "flatter" than zone Z', front-to-back, as FIG. 3C suggests; see FIG. 4 also).

Several alterations to the spherical head geometry were considered as a means of controlling the pressure distribution in the air bearing. These included: flat tapers, secondary spherical radii, bleed holes, and longitudinal slots. The latter method was thought relatively simple to implement and, although the sharp edges of the slots raise some concern about wear, the method was adopted and used successfully. Preliminary experiments with one, two and three slot geometries indicated a preference for two slots; the single slot head showed sensitivity to head attitude similar to the unslotted head, while three slots were found to offer no measurable advantage over the dual-slot pattern.

The general effects of the two longitudinal slots are quite favorable. As the two slots relieve air pressure in a region of the bearing, the localized loading is reduced, and the disk tends to wrap slightly around the head contour in both longitudinal and transverse directions. The result, is that the region of closest spacing is more widely distributed, and is well-controlled by the slot boundaries.

Figure 8:
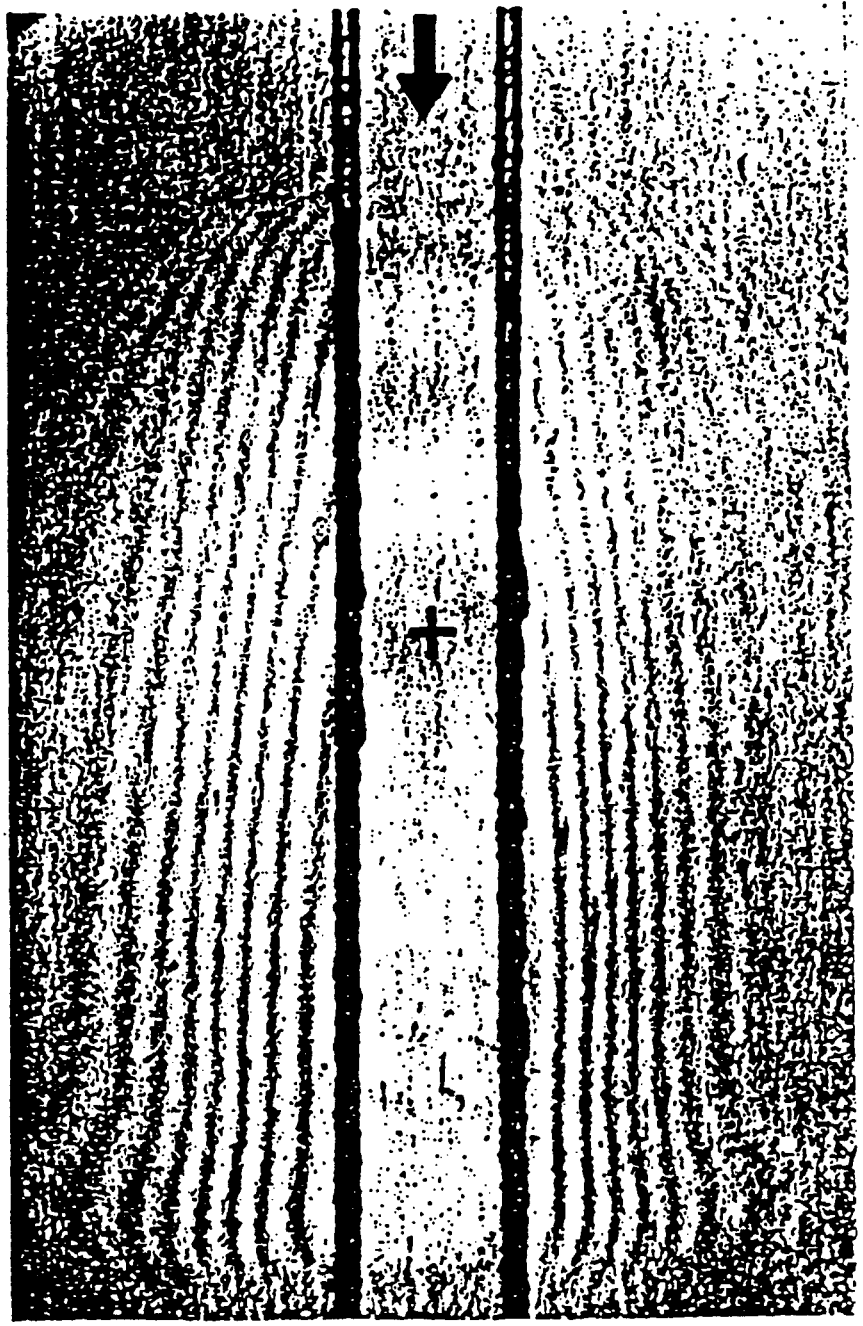
FIGS. 8 and 9 are representations of head-disk spacing in terms of optical interference patterns.

Further investigation has shown that the geometry of the head-disk interface can be controlled by varying the "slot-to slot" spacing ($D_{s-s}$) and/or the slot width ($w_s$) with slot width the more effective parameter. The result of varying slot width on interface contour is shown in FIG. 8. For wider slots, the disk is drawn toward the slot, resulting in a potential wear problem near the slot edge. The transverse flow of air is also restricted, causing a "bubble" in the center section (of the disk). From the standpoint of wear, this is undesirable, since the minimum spacing is not located at a point suitable for transducer placement, and disk clearance is thus unnecessarily sacrificed. Reducing slot width in a controlled fashion permits control of the final pattern, such that a smooth uniform contour is obtained. Using this approach according to the invention, it is possible to compensate for changes in disk surface speed, and in disk properties, while still maintaining reasonable interface contours—something rather unexpected.

Figure 3C:
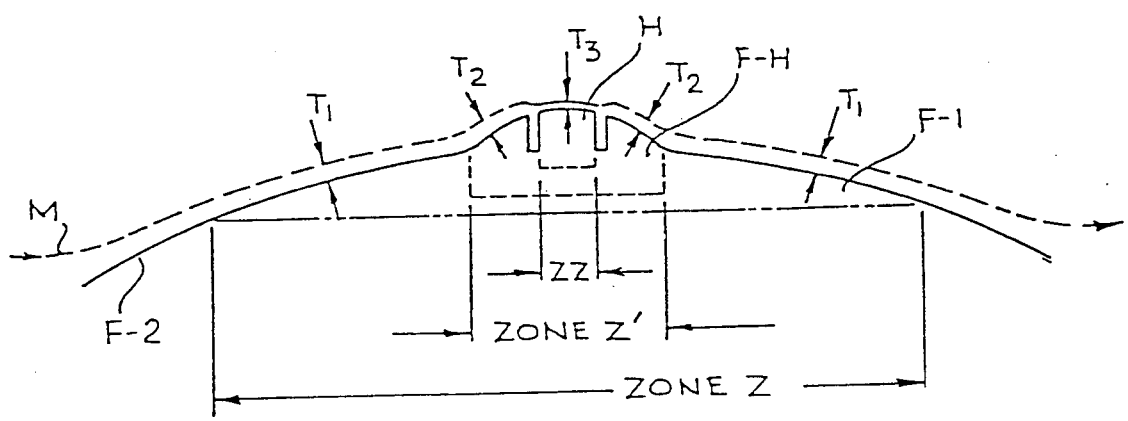

Thus, we want to pull the medium much closer-in at zone CR. To effect this a pair of like bypass grooves, or slots SL, (best seen in FIG. 3C) were cut along the direction of disk travel bracketing the core region. Such slots were found to reduce air bearing pressure in zone CR, modifying the effect of the compound curvature there and enhancing the depressing effect of atmospheric pressure there (i.e., adjacent the head H, at the apex of F-H, so that, principally, the spherical radius $R_h$ of the head foil F-H acts to control flying height in the core zone CR—thereby establishing its own reduced-pressure air bearing film there, as indicated in FIG. 3C. (FIG. 3A is a like side view with the disk segment assumed to move from left to right, while FIG. 3C is a head-on view with the disk assumed moving into the plane of the drawing).

Slots SL will be understood as disposed parallel to one another and to the comtemplated direction of medium passage, being spaced-apart a distance which will establish the width $w_z$ of this core region, (e.g., see FIG. 3C). The slots are cut to a depth and cross-section sufficient to "bleed-off" enough passing air to allow the described reduction in Bournoulli film thickness (here, for example, the thickness is reduced from about 250 u-in. to about 2-15 u-in.) in a relatively steep dive, or sharp transition, as mentioned above—yet not so much as to divert all the air and reduce film thickness to zero (lest the medium contact the head F-H, as workers will understand). Thus, slot cross-section can, to a large extent, control flying height $T_3$ over the core region CR, and preferably (as here) is arranged to divert sufficient passing air that—in region CR—the influence of foil F-1 is removed.

Figure 4:
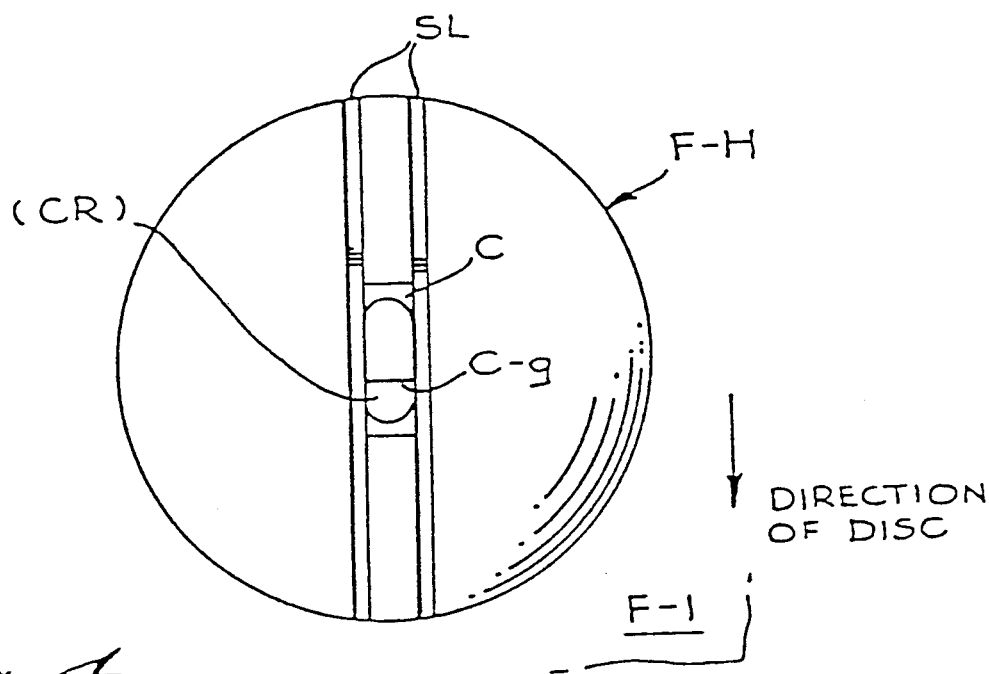
FIG. 4 is an enlarged plan view of the head in FIGS. 2 and 3 as confronted by a passing medium.

FIG. 4 is an enlarged plan view from above head-foil F-H of FIG. 3C. Here, it will be observed that a core C with a core gap C-g is apparent within the somewhat elliptical shaped core region CR. The area of region CR should be made as small as possible, since one desires to disturb the passing minimally. It has been found that increased "loading" (force on the disk toward head) can increase the area (size) of outer stabilizing zone Z; yet with no change in the size or shape of transducing zone CR—something quite surprising and significant (e.g., leading to "isolation" of core-spacing from shifts in head-loading). Of course, the perturbation caused by creating this approach zone Z will "dimple" a passing disk somewhat, throwing some energy into it and perhaps causing a secondary rippling-outward (e.g., in the downstream direction). This will be dissipated over a "settling down" time/space; the dimple-excursion should be minimized, of course, to resist inter-disk collision (collision with other disks in the pack, that is possible due to sympathetic vibrations in certain cases). Moreover, the the air bearing forces should be stiff enough so that the disks may continue to fly at their controlled altitude without impact between themselves or with the head. (Note gap C-g defines zone width ZZ).

Interestingly enough, as noted in FIG. 4, the transduce zone CR takes a relatively elliptical shape, being biased slightly off-center, to the downstream side of the head center-line CL (a few mils downstream and adjacent the core gap C-g, preferably, as indicated). The width of region CR is, of course, defined by the slots SL.

The "off-center" placement of region CR is believed due to the asymmetry in upstream-downstream forces, sucking the disk in toward the head on the one hand and peeling it away on the other. That is, there is relatively high "upstream" pneumatic resistance, vs. pulling the disk inward against the head; and there is usually a downstream suction (e.g., at times a partial-vacuum) opposing the peeling away of the disk as workers will understand.

Figure 2A:
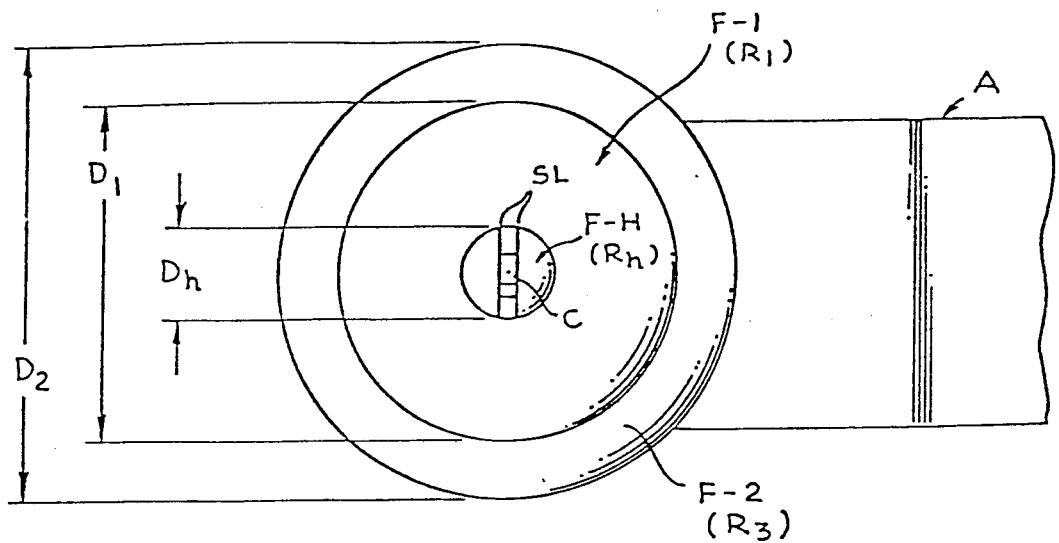

In the following table Example I, summarizes an exemplary "compound-foil" head embodiment according to the invention along the lines indicated in FIGS. 2A, 3C and 4 and discussed above:

EXAMPLE I

Figure 2B:
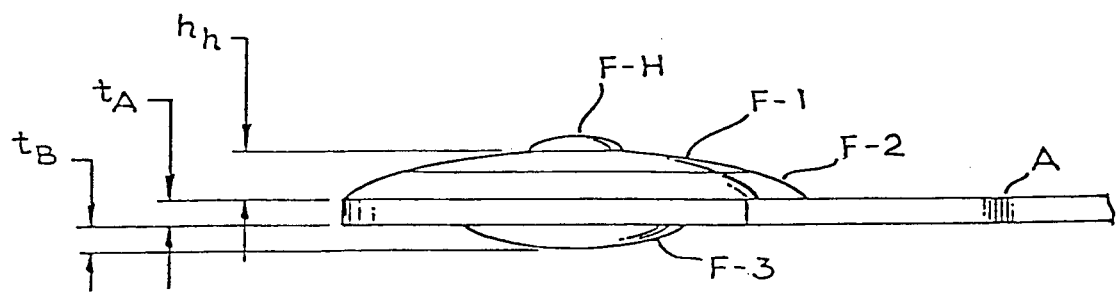

Exemplary Head with "Compound-Curvature"; (see FIG. 2B)

Spherical Mounting foil F-H: radius $(R_1)=6''$; dia. $D_1=1.1''$
Spherical Head foil F-H: radius $(R_h)=1.6''$ dia. $D_h=0.3''$
Mounted on paddle arm A, 40 mils thick; with back-foil F-3 raised 30 mils (3" radius $R_3$) and outer, relatively "steep" edge-foil F-2 of radius $R_2=3''$; dia. $D_2=1.5''$ and F-H, F-1, F-2 projected total height $h_h=67$ mils.
Pedestal F-2 is used only to thrust the transducer gaps atop F-H far enough into the floppy "dimple" and may vary in height according to this penetration depth $d_p$ desired.
Head slots SL: 6 mil wide flanking head H, extend the length of foil F-H, and as deep as F-H protrudes above F-1.
Core region CR thus formed: 10 mils wide (core-width)×50 mils long, yielding flying height $T_3$, above cores of about 12-15 u-in., and with load force of 25+gm. (added load not change $T_3$ or zone CR; only changes size of stabilizing zone Z).

| Head: | track width | 10 mils |
| | gap length | 0.1 mil |
| | throat height | 1.3 mil |
| | curvature | 0.3" dia.; |
| | | 1.6" radius (as above $D_h$, $R_h$). |

RESULTS

A slotted "compound curvature" head of the type described above has been operated for many hours with remarkable stability and high quality read/write performance, even at high bit density (e.g., 10,000 bpi). For instance, it has been run continuously, yet no oxide build-up on the head or marking of the disk has been noted. This head can be used in "dual recording" (i.e., it can "look up or look down"); also it can accommodate an ultrahigh medium velocity (up to about 1000 inches per second—versus about 100 inches per second for the usual floppy).

CONCLUSIONS

It is evident from the above that, according to the invention, an improved "air-bearing" design is provided, one suitable for use in high density magnetic recording on flexible media. That is, surrounding the typical "head button" with a relatively flatter foil, has been seen to radically affect the disk/head interaction—surprisingly so in view of the relatively minor change in head configuration. The pressure profiles in the air bearing can be controlled through the use of longitudinal slots, with the widths and placement of these slots influencing uniformity of head/disk spacing. Heads have been fabricated using 0.064 mm wide slots with a 0.500 mm center section and a 3.8 cm radius of curvature, we have found signal modulation properties to be excellent and wear relatively negligible over several hundred hours of continuous operation.

Workers will appreciate that this surrounding of a given head-foil with a mounting foil of prescribed leading-edge configuration (e.g., flatter curvature) can pull down a relatively large "dimple" in the passing disk and hold it somewhat "close" (e.g., here, order of $V_4''$) to the head-button carried thereon—leaving the bottom foil-shape (F-H) to thereafter reduce this flying height (T$_2$) still further in an inner "sub-dimple" (e.g. zone Z' within zone Z). Thus, this can superpose the larger (major) stabilized zone Z of the flatter mounting foil about the small (minor) stabilization zone Z' of the head-foil—so that perturbations of the approaching disk surface are absorbed by zone Z before reaching and affecting zone Z', and also smoothed-out downstream of Z'—e.g., a ripple might increase head spacing hs at the leading-edge of the mounting foil, but only cause a slight shift in the size of major zone Z, leaving minor zone Z' unaffected and maintaining constant size and head spacing there. This is crucially important using floppy disks as workers well know.

Or, from a slightly different viewpoint: the important minor zone Z' can work completely within a prestabilized outer zone Z and start from a much-reduced flying-height, making it considerably more effective in controlling the configuration of zone Z' (e.g., dive-location) and head spacing there (can hold closer tolerances more reliably). Slots or the like, can further be added to reduce flying height still further (e.g. at zone ZZ). And, of course, the configuration of mount-foil F-1 should be kept "regular" at its "leading-face" where it will be approached by disk surfaces from somewhat-varying quarters (e.g., approach angle along radially-inner track different from that of radially-outer track); but may vary from this along "trailing-face" portions where it need only help to "settle-down" to departing disk surfaces (e.g., sufficient to minimize turbulance, flutter, etc. before the revolution is completed and this disk-surface may once more pass the head F-H). For instance, workers may visualize other, different trailing-face configurations (e.g., elongate and streamlined as with an air-foil cross-section) serving this function. Also, radial-outward portions of foil F-1 may virtually be ignored (e.g., cut-off, if convenient) in many cases, as long as the cited purposes of the leading and trailing-faces are served. Most of all, note that this leading-face configuration is "regular", presenting the same curvature to disk surfaces, no matter what their approach direction. Of course, convenience will often dictate making the foil F-1 so it presents the same curvature in all directions, as in FIGS. 2A, 2B, etc.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein may also be applicable to tape systems and the like in certain cases. Also, this invention is applicable with other "compound-foil" configurations and is useful in other forms of recording and/or reproducing systems.

The above examples of possible variations of the present invention are merely illustrative. Accordingly, the present invention is to be considered as including all possible modifications and variations coming with the scope of the invention as defined by the appended claims.

What is claimed is:

1. A method of stabilizing and transducing passing flexible magnetic recording media, comprising the steps of:

providing a magnetic transducer structure; disposing said transducer on rigid arm means; disposing at least one prescribed head-foil means of given, regular lead curvature along all leading head-co fronting face portions intermediate the transducer and arm means;

whereby said media may approach the foil means from a number of directions and still confront a constant, regular hydrodynamic surface configuration; arranging and positioning this foil means to be presented in convex, "air-bearing-generating" relation with said passing media and in relatively rigid, stationary relation therewith, whereby to develop hydrodynamic forces which constrain the media to "over-fly" the rigid foil means and associated transducer structure at prescribed height levels; and bringing associated media portions into operative relation adjacent said foil means to be so constrained.

2. The method as recited in claim 1 wherein the foil means is fashioned and positioned on said arm means so as to exhibit one or more relatively spherical convex surface configurations along said lead-face portions; and whereby all passing media segments are drawn-in against said transducer means so as to establish a prescribed penetration distance d$_p$ into the "plane" of the passing medium segments.

3. The method as recited in claim 2 wherein the trailing portions of said foil means are configured so as to minimize turbulance and medium flutter and to quickly attenuate any medium disturbance.

4. The method as recited in claim 2 wherein at least one pair of relief means are cut into said foil means at sites symmetrically flanking the transducer structure, those relief means being arranged and disposed to reduce the flying height St of said passing medium above the transducer structure and thus generate a prescribed transducing zone while limiting the width of the zone, laterally of the direcition of media translation.

5. The method as recited in claim 1 wherein said leading-face portions are configured to "draw" passing medium portions toward themselves sufficient to establish a prescribed "transducer-spacing" S$_t$ and associated upstream "entry zone" relative to these passing medium portions.

6. The method as recited in claim 5 wherein said leading face portions are so configured to also shape said "entry zone" to lead smoothly into a "transducer zone" whereat said spacing S$_t$ is mentioned relatively constant despite moderate changes in penetration distance d$_p$ or in the mass per cm$^2$ of the media.

7. The method as recited in claim 5 wherein the transducer is fashioned to include a pair of relatively identical pressure-relieving relief means cut into the head supporting foil means sufficient to establish a prescribed relief and suction in the transducing zone, said relief means being disposed to symmetrically flank the transducing zone and being aligned parallel to in the contemplated direction of disk passage, also being dimensioned to reduce head spacing S$_t$ to a prescribed amount.

8. The method as recited in claim 6 wherein the trailing portions of said foil means are configured so as to minimize turbulance and medium flutter and to quickly attenuate any medium disturbance.

9. The method as recited in claim 8 wherein said foil means is so configured as to generate a relatively elliptical transducer zone with its major axis along the direction D$_r$ of media travel.

10. The method as recited in claim 9 wherein said foil means is arranged and fashioned to present a pair of superposed spherical foils, these being positioned and adapted to draw-in passing media segments so as to approach sufficiently close to the transducer to induce a transducer height $S_t$ on the order of a few micro-inches or less.

11. An improved method for providing and presenting transducer head means in prescribed non-contact transducing relation with passing segments of flexible recording media;

said method comprising fashioning prescribed head-supporting medium-stabilizing foil means; mounting the head means therein; mounting the foil means on associated rigid arm means; disposing the arm means so as to present said foil means and head means in rigid, stationary transducing relation with the path of passing media segments yet thrust into the plane thereof a prescribed penetration distance $d_p$; and bringing said media operatively adjacent the head means, in relatively free-flying unconfined relation therewith whereby to be drawn into transducing, stabilized condition by the stationary transducer-foil configuration.

12. The method of claim 11 wherein the foil means is fashioned to include prescribed lead-face portions of a prescribed regular configuration, and are so disposed as to generate a prescribed air-bearing on passage of the media segments so that they overfly the head means at a prescribed relatively miniscule flying-height and this traverses a "transducer dimple" path of prescribed configureation.

13. The method as recited in claim 12 wherein said lead-face portions are also configured and positioned to introduce an "entry zone" air film upstream of the head means.

14. The method as recited in claim 13 wherein said "leading-face" portions are fashioned and disposed to form an air-foil surface of constant configuration to medium segments approaching from any angle in a given sector, being adapted to generate an "entry-dimple" in the approaching medium segment of a prescribed height and configuration, this dimple located upstream of said head means.

15. The method as recited in claim 12 wherein said foil means is mounted on the arm means atop pedestal means of height $h_p$ sufficient to cause sufficient penetration $d_p$ of the head means.

16. The method as recited in claim 15 wherein trailing-face portions of said foil means are configured and positioned so as to minimize turbulance and flutter of the passing medium and to quickly attenuate any disturbance therein.

17. The method as recited in claim 15 wherein said arm means is cantilevered-out from base means and arranged, disposed and operated to so thrust the foil means into the plane of the passing media segment a distance $d_p$ as to cause this segment to overfly the head means in a prescribed manner.

18. The method as recited in claim 17 wherein such penetration is arranged so as to form a relatively flat elliptical "dimple" in the passing segment above the head means at height $S_t$ therefrom.

19. A method of providing and operating magnetic recording apparatus to better operate upon one or more rotatable flexible circular record-disks disposed to be rotated along a prescribed relatively flat planar reference transducing plane, this method comprising:

fashioning transducer means to include at least one transducer head adapted to be thrust into and beyond said reference plane a prescribed penetration distance $d_p$, but out of contact with said rotating disk and in transducing relation therewith;

mounting said heads in a head mount fashioned to curve, at least along prescribed lead face portions, in a first curvature adapted to induce the passing disk to be pulled toward itself; disposing this mount on associated arm means designed to carry said transducing means and adapted to so present said head, while supporting it rigid and stationary; fashioning head support means and interposing it to support said head mount upon said arm means; this support means being fashioned and disposed to present a lead-face portion exhibiting a prescribed regular curvature adapted to draw passing disk segments toward itself and to so generate a prescribed "entry-dimple" therein, the height of this support means being set to help determine the prescribed penetration distance $d_p$; said lead-face curvature being configured and adapted to draw the passing disk segments toward itself to establish a prescribed minimal medium-height $S_t$ and associated "head-dimple" in the disks whereat one or more transducing core gaps are disposed;

said head thus being adapted to be presented in penetrating, dimpling relation with prescribed radial sectors of said rotating disk so as to invoke different serial stages of Bournoulli air-films characteristic of the lead-face curvature, these stages including a "transducing film" above said head at the transducing zone and an "entry film" upstream of this "transducing zone" at the "entry-dimple".

20. A method of providing and operating a relatively rigid "multi-foil" transducer array adapted for transducing operations on passing flexible media segments, this method including:

providing read/write means mounted in associated head mount means providing said mount means with prescribed curvature along leading portions thereof whereby to induce passing segments of the media to "dimple" while passing at a prescribed height $h_m$;

providing rigid arm means supporting this mount means and adapted to present the read/write means in rigid stationary relation with the passing media plus at least one support means disposed between the arm means and the mount means and so placed and so regularly curved along lead-face portions as to generate a respective "approach zone" upstream of said read-write means, to thus gradually reduce head-to-media spacing upstream of the said "dimpling"; and causing said media segments to overfly the read-write means at said prescribed height ($h_m$) along a prescribed read/write path defining the prescribed "transducing dimple" $d_t$, this all being effected without media "flutter" or instabilities and without need to move the array toward or away from the passing media segments which thus become relatively "self-spacing".

21. The method as recited in claim 20 wherein prescribed relief means are cut into the face of said head-mount means such as to control the configuration and height $d_t$ of said dimple and so as to yield a prescribed minimum head-to-medium spacing $S_t$.

22. The method as recited in claim 20 wherein said support means is fashioned to comprise a foil with a spherical lead-face plus a supporting pedestal, this being arranged, positioned and adapted to bring the passing medium segments closer, gradually, to said read/write means, and to thereby help "pre-stabilize" them.

23. The method as recited in claim 20 wherein each said support means is formed, disposed and adapted to draw passing medium segments toward the head-mount means and thereby establish an entry-zone dimple $d_e$ in the medium of prescribed configuration and height above said read/write means.

* * * * *